US010437695B2

(12) United States Patent
Sobue et al.

(10) Patent No.: US 10,437,695 B2
(45) Date of Patent: Oct. 8, 2019

(54) FAULT INFORMATION PROVIDING SERVER AND FAULT INFORMATION PROVIDING METHOD FOR USERS OF IN-VEHICLE TERMINALS

(71) Applicant: CLARION CO., LTD., Saitama-shi, Saitama (JP)

(72) Inventors: Tsuneo Sobue, Tokyo (JP); Yasushi Nagai, Saitama (JP); Hiroyoshi Endou, Saitama (JP); Kyousuke Tsurusu, Saitama (JP); Tatsuaki Osafune, Tokyo (JP)

(73) Assignee: CLARION CO., LTD., Saitama (JP)

( * ) Notice: Subject to any disclaimer, the term of this patent is extended or adjusted under 35 U.S.C. 154(b) by 218 days.

(21) Appl. No.: 15/531,743

(22) PCT Filed: Nov. 25, 2015

(86) PCT No.: PCT/JP2015/083077
§ 371 (c)(1),
(2) Date: May 31, 2017

(87) PCT Pub. No.: WO2016/104025
PCT Pub. Date: Jun. 30, 2016

(65) Prior Publication Data
US 2017/0269986 A1 Sep. 21, 2017

(30) Foreign Application Priority Data
Dec. 25, 2014 (JP) .................. 2014-262091

(51) Int. Cl.
G06F 11/32 (2006.01)
G06F 11/07 (2006.01)
(Continued)

(52) U.S. Cl.
CPC .......... *G06F 11/327* (2013.01); *G06F 11/079* (2013.01); *G06F 11/0709* (2013.01);
(Continued)

(58) Field of Classification Search
CPC ............... G06F 11/008; G06F 11/0739; G06F 11/0766; G06F 11/0769; G06F 11/0784;
(Continued)

(56) References Cited

U.S. PATENT DOCUMENTS 7,793,141 B1 * 9/2010 Miller ................. G06F 11/0709
714/4.4
2001/0044275 A1 * 11/2001 Yamaguchi ............. H04L 29/06
455/11.1
(Continued)

FOREIGN PATENT DOCUMENTS

JP 2002-033731 A 1/2002
JP 2003-259006 A 9/2003
(Continued)

OTHER PUBLICATIONS

Extended European Search Report dated Jul. 30, 2018 for the European Patent Application No. 15872594.5.
(Continued)

*Primary Examiner* — Gabriel Chu
(74) *Attorney, Agent, or Firm* — Volpe and Koenig, P.C.

(57) ABSTRACT

A fault information providing server which is connected to a processing server group configured from a plurality of servers, and which provides information related to a fault that occurred in the processing server group to a user of a service provided by the processing server group, comprises: a fault occurrence/recovery management unit which manages fault occurrence of the processing server group; a log management unit which manages log information related to a history of service provided by each server of the process-
(Continued)

ing server group; a rule management unit which manages rules related to a service impact representing an impact on the service caused by the fault; a service impact calculation unit which calculates the service impact based on the log information and the rules; and a service impact notification unit which notifies the service impact calculated by the service impact calculation unit to the user.

14 Claims, 12 Drawing Sheets

(51) Int. Cl.
    *G06Q 30/00*     (2012.01)
    *G06F 11/34*     (2006.01)

(52) U.S. Cl.
    CPC ...... *G06F 11/0739* (2013.01); *G06F 11/0751* (2013.01); *G06F 11/0769* (2013.01); *G06F 11/3452* (2013.01); *G06F 11/3495* (2013.01); *G06Q 30/016* (2013.01)

(58) Field of Classification Search
    CPC .... G06F 11/3065; G06F 11/327; G06F 11/34; G06F 11/3452; G06F 11/3476; H04L 41/06; H04L 41/069; H04L 41/5061; H04L 41/5067
    See application file for complete search history.

(56) References Cited

U.S. PATENT DOCUMENTS

| | | | |
|---|---|---|---|
| 2002/0073364 A1 | 6/2002 | Katagiri et al. | |
| 2003/0046329 A1* | 3/2003 | Sasabe | H04L 41/0253 709/201 |
| 2004/0163007 A1* | 8/2004 | Mirkhani | G06F 11/008 714/1 |
| 2005/0022190 A1* | 1/2005 | Tachihara | G06F 11/0709 718/100 |
| 2006/0072707 A1* | 4/2006 | Araujo | F16J 15/441 379/1.01 |
| 2006/0112317 A1* | 5/2006 | Bartolini | H04L 41/0631 714/47.2 |
| 2009/0006884 A1* | 1/2009 | Cahill | H04L 12/403 714/4.1 |
| 2010/0157964 A1* | 6/2010 | Yoon | H04W 76/18 370/338 |
| 2011/0191630 A1* | 8/2011 | Li | G06F 11/07 714/25 |
| 2012/0254669 A1* | 10/2012 | Xia | G06F 11/004 714/47.2 |
| 2013/0086194 A1* | 4/2013 | Estes | G06F 11/0709 709/207 |
| 2013/0290791 A1* | 10/2013 | Basile | H04L 43/16 714/47.1 |
| 2013/0305083 A1 | 11/2013 | MacHida | |
| 2016/0013990 A1* | 1/2016 | Kulkarni | H04L 41/22 709/224 |
| 2016/0072688 A1* | 3/2016 | Desai | H04L 41/065 709/224 |
| 2017/0024271 A1* | 1/2017 | Teli | G06F 16/22 |

FOREIGN PATENT DOCUMENTS

| | | |
|---|---|---|
| JP | 3642004 B2 | 4/2005 |
| JP | 2009-151456 A | 7/2009 |
| JP | 5370624 B2 | 12/2013 |

OTHER PUBLICATIONS

International Search Report, PCT/JP2015/083077, dated Feb. 16, 2016, 2 pgs.

* cited by examiner

| MANUFACTURER NAME | IN-VEHICLE TERMINAL GROUP | IN-VEHICLE TERMINAL ID |
|---|---|---|
| MANUFACTURER A | GROUP 1 | A12345 B56789 ... |
| MANUFACTURER A | GROUP 2 | C98765 ... |
| MANUFACTURER B | GROUP 3 | ... |
| ... | ... | ... |

| SERVICE IMPACT | CALCULATION RULES |
|---|---|
| SERVICE AVAILABILITY | (TOTAL TIME - SYSTEM HALT TIME) /TOTAL TIME |
| RESPONSE TIME | AVERAGE VALUE OF "REPLY TIME OF WEB SERVER - REQUEST RECEPTION TIME OF WEB SERVER" |
| NUMBER OF CONNECTED TERMINALS | NUMBER OF TERMINALS FROM WHICH REQUESTS WERE RECEIVED BY WEB SERVER |
| NUMBER OF ACCESSES | NUMBER OF REQUESTS RECEIVED BY WEB SERVER |
| ... | ... |

501 — SERVICE IMPACT column
502 — CALCULATION RULES column

| SERVICE IMPACT | ESTIMATION RULES |
|---|---|
| SCHEDULED FAULT RECOVERY TIME | ADD "TIME REQUIRED FOR RECOVERY" TO "CURRENT TIME"<br><br>"TIME REQUIRED FOR RECOVERY" IS IDENTIFIED AS FOLLOWS:<br><br>if ("AA" IS INCLUDED IN MOST RECENT LOG OF Web SERVER), REQUIRED TIME = 5 MINUTES<br><br>else if ("BB" IS INCLUDED IN MOST RECENT LOG OF AP SERVER), REQUIRED TIME = 7 MINUTES<br><br>else if ("CC" IS INCLUDED IN MOST RECENT LOG OF AP SERVER), REQUIRED TIME = 8 MINUTES<br>... |
| NUMBER OF UNUSABLE TERMINALS | TO BE ESTIMATED BASED ON "TIME OF FAULT OCCURRENCE", "SCHEDULED FAULT RECOVERY TIME", AND "HOURLY AVERAGE NUMBER OF CONNECTED TERMINALS" |
| NUMBER OF CONNECTION ERRORS | TO BE ESTIMATED BASED ON "TIME OF FAULT OCCURRENCE", "SCHEDULED FAULT RECOVERY TIME", AND "HOURLY AVERAGE NUMBER OF ACCESSES" |
| RESPONSE DELAY RATE | TO BE ESTIMATED BASED ON "HOURLY AVERAGE RESPONSE TIME", "SERVER REDUCTION RATIO = NUMBER OF SERVERS IN OPERATION ÷ NUMBER OF SERVERS USED FOR REDUNDANT CONFIGURATION" |
| ... | ... |

601 — SERVICE IMPACT column
602 — ESTIMATION RULES column

FAULT INFORMATION PROVIDING SERVER AND FAULT INFORMATION PROVIDING METHOD FOR USERS OF IN-VEHICLE TERMINALS

TECHNICAL FIELD

The present invention relates to a fault information providing server and a fault information providing method which provide fault information to a system user.

BACKGROUND ART

A system which uses a terminal such as an in-vehicle device connected via a wireless communication network to provide various services to a system user is known. If some kind of fault occurs in this kind of system, it is desirable to notify the status at the time of fault occurrence to the user. PTL 1 discloses a relay device which, upon detecting a contents service apparatus that is not in an operable state, creates a service menu capable of recognizing what kind of state the contents server apparatus is in and pushes the created service menu to a portable terminal.

CITATION LIST

Patent Literature

[PTL 1] Japanese Patent No. 3642004

SUMMARY OF THE INVENTION

Problem to be Solved by the Invention

When the relay device disclosed in PTL 1 is used, while the system user can know of the existence of the contents server apparatus in an inoperable state at the time that a system fault occurs, the system user cannot know the impact on the provided service.

Means to Solve the Problem

The fault information providing server according to the present invention, which is connected to a processing server group configured from a plurality of servers, and which provides information related to a fault that occurred in the processing server group to a user of a service provided by the processing server group, comprises: a fault occurrence/recovery management unit which manages fault occurrence of the processing server group; a log management unit which manages log information related to a history of service provided by each server of the processing server group; a rule management unit which manages rules related to a service impact representing an impact on the service caused by the fault; a service impact calculation unit which calculates the service impact based on the log information and the rules; and a service impact notification unit which notifies the service impact calculated by the service impact calculation unit to the user.

The fault information providing method according to the present invention uses a fault information providing server connected to a processing server group configured from a plurality of servers and provides information related to a fault that occurred in the processing server group to a user of a service provided by the processing server group, wherein the fault information providing server: manages fault occurrence of the processing server group; manages log information related to a history of service provided by each server of the processing server group; manages rules related to a service impact representing an impact on the service caused by the fault; calculates the service impact based on the log information and the rules; and notifies the calculated service impact to the user.

Advantageous Effect of the Invention

According to the present invention, a service user can know the impact on the provided service when a system fault occurs.

BRIEF DESCRIPTION OF THE DRAWINGS

FIG. 2 is a diagram showing a table configuration example of data stored in the in-vehicle terminal management unit.

FIG. 5 is a diagram showing a table configuration example of data stored in the calculation rule management unit.

FIG. 6 is a diagram showing a table configuration example of data stored in the estimation rule management unit.

DESCRIPTION OF EMBODIMENTS

An embodiment of the present invention is now explained in detail with reference to the appended drawings.

Figure 1:
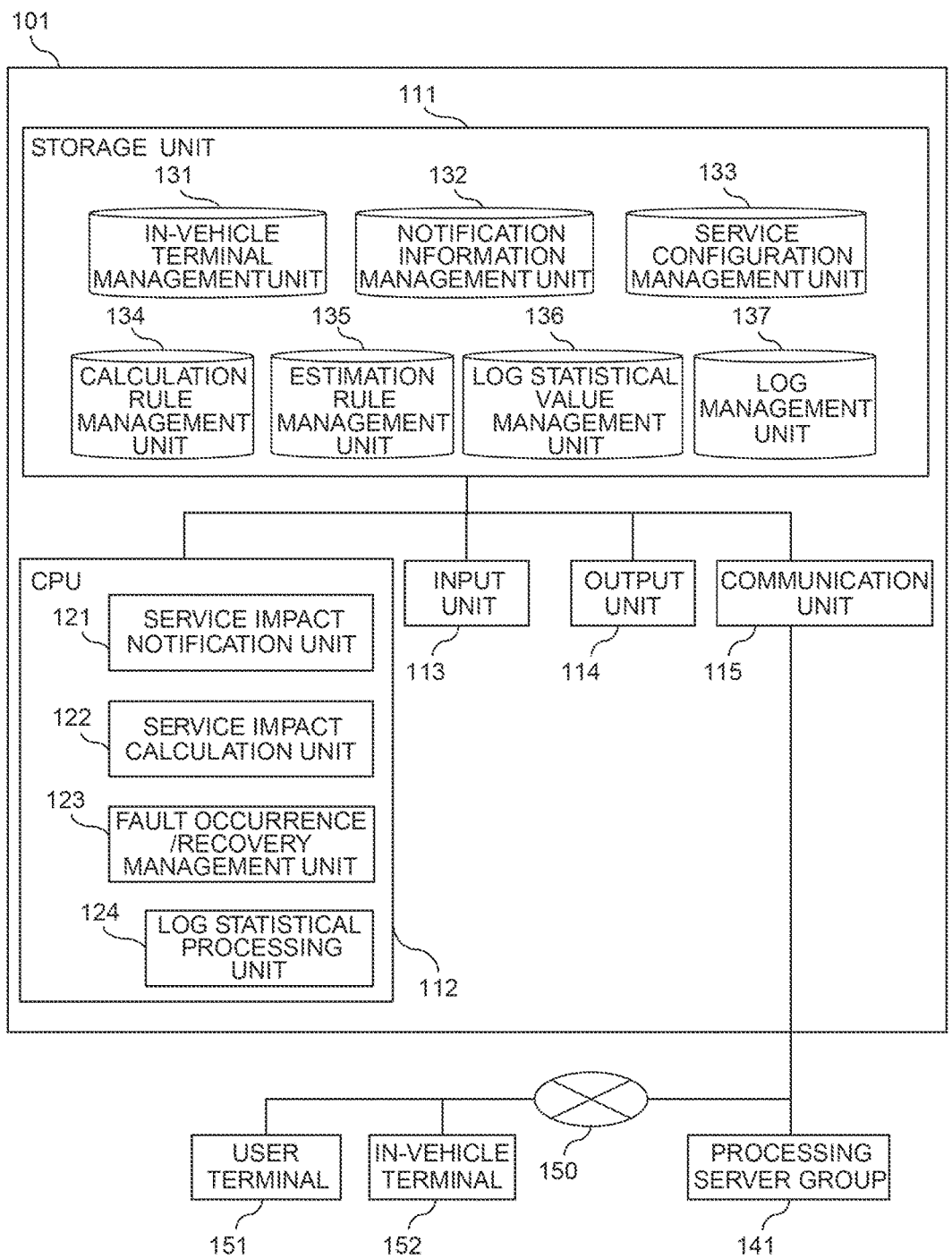
FIG. 1 is a diagram showing a configuration of the fault information providing server according to an embodiment of the present invention.

FIG. 1 is a diagram showing a configuration of the fault information providing server according to an embodiment of the present invention. The fault information providing server 101 comprises a CPU (Central Processing Unit) 112, an input unit 113, an output unit 114, a communication unit 115, and a storage unit 111.

The storage unit 111 is configured from a semiconductor memory, an HDD (Hard Disk Drive) or the like, and stores various programs and data. For example, as a result of installing the programs and data, which are stored in the computer readable storage medium, into the fault information providing server 101, these programs and data can be stored in the storage unit 111. The storage unit 111 functionally includes an in-vehicle terminal management unit 131, a notification information management unit 132, a service configuration management unit 133, a calculation rule management unit 134, an estimation rule management unit 135, a log statistical value management unit 136, and a log management unit 137.

The CPU 112 executes various types of arithmetic processing for operating the fault information providing server 101 based on the programs and data stored in the storage unit 111. The CPU 112 functionally includes a service impact notification unit 121, a service impact calculation unit 122, a fault occurrence/recovery management unit 123, and a log statistical processing unit 124.

The input unit 113 detects operational inputs from the operator and outputs the detected operational inputs to the CPU 112. The input unit 113 is configured, for example, from a mouse or a keyboard.

The output unit 114 displays a screen or outputs sounds according to instructions from the CPU 112. The output unit 114 is configured from, for example, a display or a speaker.

The communication unit 115 communicates with a processing server group 141, a user terminal 151 and an in-vehicle terminal 152, which are connected to the fault information providing server 101, according to instructions from the CPU 112. The fault information providing server 101 and the processing server group 141 are connected to the user terminal 151 and the in-vehicle terminal 15 via the internet 150. The internet 150 may be based on a wired connection, or a wireless connection.

The processing server group 141 is configured from a plurality of servers, and provides various services to the user terminal 151 and the in-vehicle terminal 152. The in-vehicle terminal 152 is a terminal that is held by the end user as the system user. For example, a car navigation system installed in a vehicle or a smartphone carried into a vehicle by the end user can be used as the in-vehicle terminal 152. The user terminal 151 is, for example, a terminal held by a system user other than the end user, such as an administrator of the manufacturer that is selling the vehicle to the end user. Note that, for the sake of simplification, FIG. 1 only illustrates one user terminal 151 and one in-vehicle terminal 152. However, in reality, multiple user terminals 151 and in-vehicle terminals 152 are connected to the processing server group 141 and the fault information providing server 101 via the internet 150 according to the number of system users.

The storage unit 111 and the CPU 112 are now explained in detail. When a system fault occurs in the processing server group 141, the fault information providing server 101 notifies the impact on the provided service caused by the occurrence of a system fault to the user. Each of the foregoing components equipped in the storage unit 111 and the CPU 112 is used for notifying the service impact.

The service impact notification unit 121 acquires the service impact calculated by the service impact calculation unit 122 and output from the fault occurrence/recovery management unit 123. Based on the acquired service impact, the service impact notification unit 121 generates service impact information representing the impact on the service caused by the occurrence of a fault in the processing server group 141, and outputs the generated service impact information to the communication unit 115. The service impact information output from the service impact notification unit 121 to the communication unit 115 is sent by the communication unit 115 to the user terminal 151 and the in-vehicle terminal 152 via the internet 150. The service impact notification unit 121 thereby notifies the service impact to the user.

When notifying the service impact to the in-vehicle terminal 152, the service impact notification unit 121 makes an inquiry to the in-vehicle terminal management unit 131 and identifies the in-vehicle terminal group to be notified, and notifies the calculated service impact to the identified group. For example, when the in-vehicle terminal 152 to be notified is "in-vehicle terminal ID=A12345", the in-vehicle terminal group is identified by searching the in-vehicle terminal management unit 131 with the in-vehicle terminal ID of "A12345" as the key. Specifically, among the information stored in the in-vehicle terminal management unit 131 based on the data structure shown in FIG. 2, information containing "A12345" in the column of the in-vehicle terminal ID 203 is searched, and "group 1" is identified from the contents of the corresponding column of the in-vehicle terminal group 202. Subsequently, among the service impact items received from the fault occurrence/recovery management unit 123, the service impact of "in-vehicle terminal group=group 1" is notified to the in-vehicle terminal 152. Here, all items of the service impact of "in-vehicle terminal group=group 1" may be notified, or only certain items may be notified. When notifying the service impact to the in-vehicle terminal 152, information such as the time of fault occurrence is also notified.

The timing of notifying the service impact from the service impact notification unit 121 to the user terminal 151 and the in-vehicle terminal 152 may be an arbitrary timing. For example, when the user terminal 151 or the in-vehicle terminal 152 accesses the fault information providing server 101, the service impact may be notified from the service impact notification unit 121 according to such access. Moreover, the service impact may be notified at the time that a fault occurs in the processing server group 141 or notified periodically during the fault occurrence. Furthermore, the service impact may be notified only at a specific timing such as at the time of fault occurrence and at the time of recovery.

The service impact calculation unit 122 calculates the service impact according to the operational state of the processing server group 141 based on a request from the fault occurrence/recovery management unit 123. The calculation result of the service impact by the service impact calculation unit 122 is output to the service impact notification unit 121 via the fault occurrence/recovery management unit 123. Note that the processing contents of the service impact calculation unit 122 will be described in detail later with reference to the flowchart of FIG. 9.

The fault occurrence/recovery management unit 123 receives, via the communication unit 115, information related to the system fault occurrence and recovery status sent from the processing server group 141. Based on this information, the fault occurrence/recovery management unit 123 determines whether a system fault has occurred in the processing server group 141. Upon determining that a system fault has occurred, the fault occurrence/recovery management unit 123 requests the service impact calculation unit 122 to calculate the service impact caused by the fault. The fault occurrence/recovery management unit 123 subsequently acquires the calculation result of the service impact from the service impact calculation unit 122, and outputs the acquired calculation result to the service impact notification unit 121. Here, other information related to the fault, such as the time of occurrence of the fault, may also be notified. Note that the processing contents of the fault occurrence/recovery management unit 123 will be described in detail later with reference to the flowchart of FIG. 10.

The log statistical processing unit 124 periodically acquires, from the log management unit 137, log information related to the service provided by each server of the processing server group 141 stored in the log management unit 137. The log statistical processing unit 124 subsequently performs statistical processing to the acquired log information, and stores the result in the log statistical value management unit 136.

The in-vehicle terminal management unit 131 stores data for managing the in-vehicle terminals 152 in group units. Based on the data stored in the in-vehicle terminal management unit 131, the service impact notification unit 121 can identify the in-vehicle terminal 152 to which the service impact is to be notified at the time that a fault occurs in the processing server group 141, and send the service impact information to the identified in-vehicle terminal 152 by using the communication unit 115.

FIG. 2 is a diagram showing a table configuration example of data stored in the in-vehicle terminal management unit 131. The in-vehicle terminal management unit 131 groups and manages a plurality of in-vehicle terminals 152 according to the installed vehicle model, year of release and type by using, for instance, the data of the table configuration illustrated in FIG. 2. The data table of FIG. 2 is configured from the respective items of a manufacturer name 201, an in-vehicle terminal group 202, and an in-vehicle terminal ID 203.

The manufacturer name 201 indicates the name of the manufacturer/seller of the vehicle in which the in-vehicle terminal 152 belonging to the respective in-vehicle terminal groups is installed. The in-vehicle terminal group 202 indicates the group name that is assigned to the respective in-vehicle terminal groups. The in-vehicle terminal ID 203 indicates the identifier for uniquely identifying the in-vehicle terminal 152 belonging to the respective in-vehicle terminal groups.

In the first line of the data table of FIG. 2, "manufacturer A" is indicated in the column of manufacturer name 201, "group 1" is indicated in the column of in-vehicle terminal group 202, and "A12345", "B56789" are indicated in the column of in-vehicle terminal ID 203, respectively. This represents that the in-vehicle terminals 152 respectively identified by the ID numbers of A12345 and B56789 belong to the in-vehicle terminal group of group 1, and the vehicles in which these in-vehicle terminals 152 are installed are being manufactured and sold by manufacturer A.

Moreover, in the second line, "manufacturer A" is indicated in the column of manufacturer name 201, "group 2" is indicated in the column of in-vehicle terminal group 202, and "C98765" is indicated in the column of in-vehicle terminal ID 203, respectively. This represents that the in-vehicle terminal 152 identified by the ID number of C98765 belongs to the in-vehicle terminal group of group 2, and the vehicles in which this in-vehicle terminal 152 is installed are being manufactured and sold by manufacturer A.

The notification information management unit 132 stores data for managing notification information related to the items of the service provided from the processing server group 141 to the in-vehicle terminal 152 and the items of the service impact to be notified by the fault information providing server 101 at the time that a fault occurs in the processing server group 141. Based on the data stored in the notification information management unit 132, the service impact notification unit 121 can identify the items of the service impact to be notified to the user terminal 151 and the in-vehicle terminal 152 at the time a fault occurs in the processing server group 141.

Figure 3:
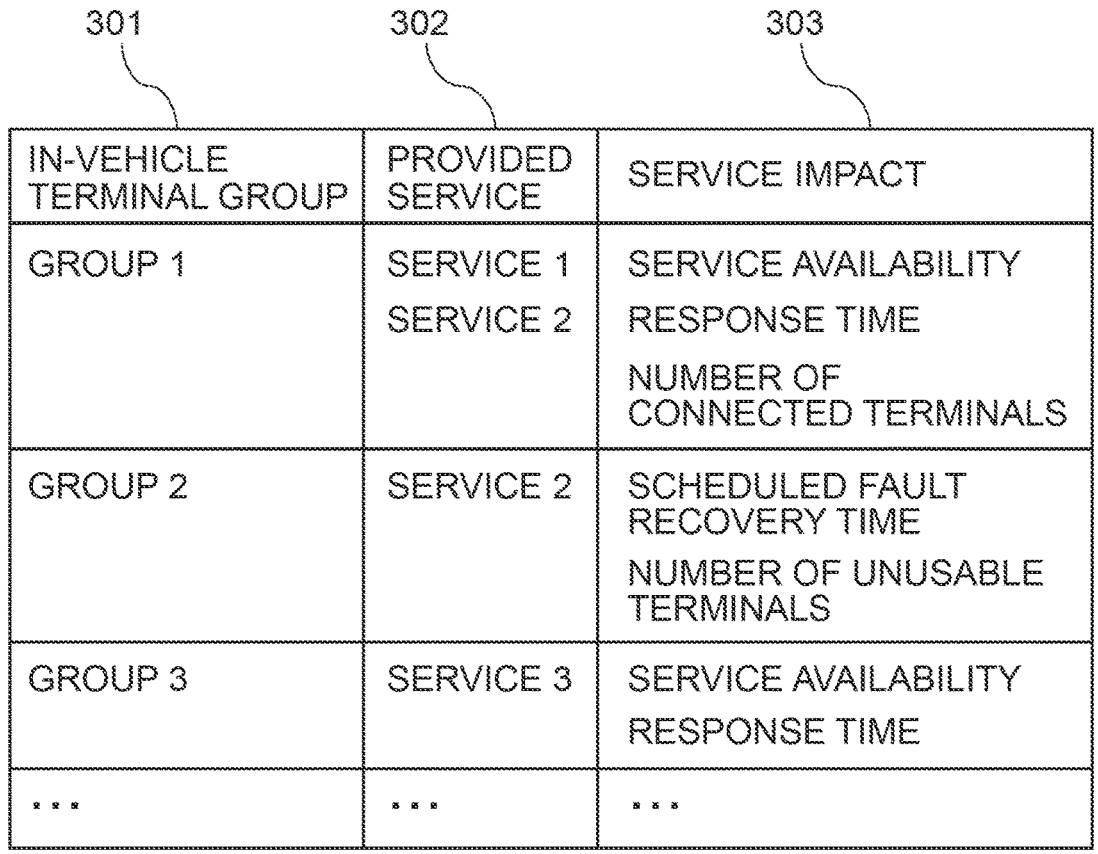
FIG. 3 is a diagram showing a table configuration example of data stored in the notification information management unit.

FIG. 3 is a diagram showing a table configuration example of data stored in the notification information management unit 132. The notification information management unit 132 manages, for each in-vehicle terminal group, the service provided from the processing server group 141 and the service impact to be notified at the time a fault occurs in the processing server group 141 by using, for instance, the data of the table configuration illustrated in FIG. 3. The data table of FIG. 3 is configured from the respective items of an in-vehicle terminal group 301, a provided service 302, and a service impact 303.

The in-vehicle terminal group 301 represents the group name that is assigned to the respective in-vehicle terminal groups, and corresponds to the in-vehicle terminal group 202 of the in-vehicle terminal management unit 131 shown in FIG. 2. The provided service 302 represents the type of service that is being provided by the processing server group 141 to the respective in-vehicle terminal groups. The service impact 303 represents the items of the service impact to be provided by the fault information providing server 101 to the user terminal 151 and the in-vehicle terminal 152 at the time a fault occurs in the processing server group 141.

In the first line of the data table of FIG. 3, "group 1" is indicated in the column of in-vehicle terminal group 301, "service 1" and "service 2" are indicated in the column of provided service 302, and "service availability", "response time", and "number of connected terminals" are indicated in the column of service impact 303, respectively. This represents that the in-vehicle terminal 152 belonging to group 1 is receiving services corresponding to service 1 and service 2 from the processing server group 141, and, when a fault occurs in the processing server group 141, information regarding service availability, response time, and number of connected terminals is notified as the service impact to the in-vehicle terminal 152 of group 1 and the corresponding user terminal 151. Here, the user terminal 151 corresponding to the in-vehicle terminal 152 of group 1 is the user terminal 151 of manufacturer A, and this can be identified based on the stored data of the in-vehicle terminal management unit 131 illustrated in FIG. 2.

Moreover, in the second line, "group 2" is indicated in the column of in-vehicle terminal group 301, "service 2" is indicated in the column of provided service 302, and "scheduled fault recovery time" and "number of unusable terminals" are indicated in the column of service impact 303, respectively. This represents that the in-vehicle terminal 152 belonging to group 2 is receiving the service of service 2 from the processing server group 141, and, when a fault occurs in the processing server group 141, information regarding scheduled fault recovery time and number of unusable terminals is notified as the service impact to the in-vehicle terminal 152 of group 2 and the corresponding user terminal 151.

The service configuration management unit 133 stores data for managing the service configuration of the processing server group 141. Based on the data stored in the service configuration management unit 133, the service impact calculation unit 122 can identify the server from which log information to be used in calculating the service impact at the time that a fault occurs in the processing server group 141 should be acquired.

Figure 4:
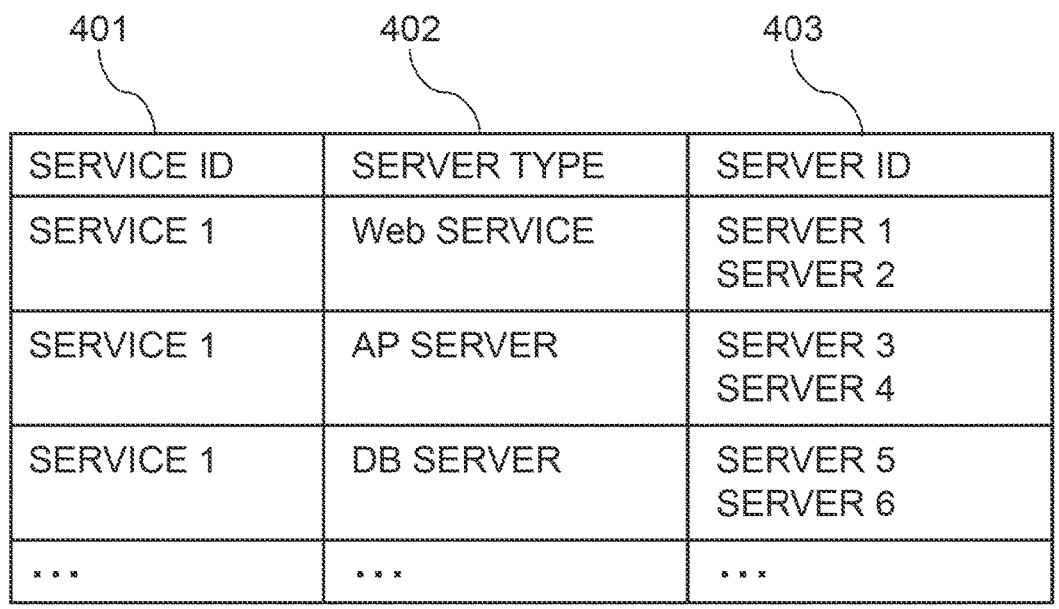
FIG. 4 is a diagram showing a table configuration example of data stored in the service configuration management unit.

FIG. 4 is a diagram showing a table configuration example of data stored in the service configuration management unit 133. The service configuration management unit 133 manages, for each service, the respective servers configuring the processing server group 141 by using, for instance, the data of the table configuration illustrated in FIG. 4. The data table of FIG. 4 is configured from the respective items of a service ID 401, a server type 402, and a server ID 403.

The service ID 401 represents an identifier for uniquely identifying the service provided by each server of the processing server group 141, and corresponds to the provided service 302 of the notification information management unit 132 shown in FIG. 3. The server type 402 represents the role of each server. The server ID 403 represents an identifier for uniquely identifying the server that is specifically implementing the role of each server.

In the first line of the data table of FIG. 4, "service 1" is indicated in the column of service ID 401, "Web server" is indicated in the column of server type 402, and "server 1" and "server 2" are indicated in the column of server ID 403, respectively. Moreover, in the second line, "service 1" is indicated in the column of service ID 401, "AP server" is indicated in the column of server type 402, and "server 3" and "server 4" are indicated in the column of server ID 403, respectively, and in the third line, "service 1" is indicated in the column of service ID 401, "DB server" is indicated in the column of server type 402, and "server 5" and "server 6" are indicated in the column of server ID 403, respectively. This represents that service 1 is being provided by server 1 and server 2 as Web servers, server 3 and server 4 as AP (application) servers, and server 5 and server 6 as DB (database) servers.

The calculation rule management unit 134 stores data for managing the calculation rules to be used in calculating the current impact on the service at the time that a fault occurs in the processing server group 141. Based on the data stored in the calculation rule management unit 134, the service impact calculation unit 122 can calculate the service impact at the time that a fault occurs in the processing server group 141.

FIG. 5 is a diagram showing a table configuration example of data stored in the calculation rule management unit 134. The calculation rule management unit 134 manages calculation rules which define the method of calculating the current service impact from the log information stored in the log management unit 137 by using, for instance, the data of the table configuration illustrated in FIG. 5. The data table of FIG. 5 is configured from the respective items of a service impact 501, and calculation rules 502.

The service impact 501 represents information to be provided by the fault information providing server 101 to the user terminal 151 and the in-vehicle terminal 152 at the time that a fault occurs, and corresponds to the service impact 303 of the notification information management unit 132 shown in FIG. 3. Note that, preferably, the respective items of the service impact 501 do not overlap with the service impact (service impact 601 indicated in FIG. 6 described later) in the stored data of the estimation rule management unit 135. In other words, the service impact of the same item name should not be defined in both the calculation rule management unit 134 and the estimation rule management unit 135. As a result of adopting the foregoing method, it is possible to determine whether the respective items of the service impact should be calculated using the calculation rules managed by the calculation rule management unit 134, or the estimation rules managed by the estimation rule management unit 135. The calculation rules 502 represent the specific calculation method of the respective items of the service impact 501.

In the first line of the data table of FIG. 5, "service availability" is indicated in the column of service impact 501, and "(total time−system halt period)/total time" is indicated in the column of calculation rules 502, respectively. This represents that "service availability", which is one type of service impact, can be calculated by subtracting "system halt period" from "total time" and then dividing the result by "total time". Note that "total time" represents the total uptime of all servers providing services in the processing server group 141, and "system halt period" represents the halt period of the server caused by the fault. The foregoing information can be acquired from the log information stored in the log management unit 137.

Moreover, in the second line, "response time" is indicated in the column of service impact 501, and "average value of 'reply time of Web server−request reception time of Web server'" is indicated in the column of calculation rules 502. This represents that the response time, which is one type of service impact, can be calculated as the average value of the time from the request reception time to the reply time of the Web server in the processing server group 141. Note that the specific server ID of the Web server can be identified based on the stored information of the service configuration management unit 133 illustrated in FIG. 4. Here, let it be assumed that the log information stored in the log management unit 137 includes information (e.g.: transaction ID or the like) capable of linking the reception of a request from each in-vehicle terminal 152 and the reply to the received request. The response time can be calculated by obtaining, based on the foregoing information, the average value of the time required from the reception to the reply of each request. Note that while the average value of the time from the request reception time to the reply time is used in the foregoing example, the maximum value or the minimum value may also be used.

Moreover, in the fourth line, "number of accesses" is indicated in the column of service impact 501, and "number of requests received by Web server" is indicated in the column of calculation rules 502, respectively. This represents that the number of accesses, which is one type of service impact, can be calculated as the number of requests received by the Web server of the processing server group 141. The number of requests can be acquired from the log information stored in the log management unit 137. Note that, when there are a plurality of Web servers in the processing server group 141, the average value or total value of the number of requests of the respective Web servers may be calculated as the number of accesses. Moreover, when there is a retry from the same in-vehicle terminal 152, the number of accesses may be calculating by also deeming such retry as one request. Otherwise, the number of accesses may be calculated by omitting retries, or omitting retries during a given period.

As explained above, the calculation rule management unit 134 stores calculation rules for calculating the value of the respective items of the service impact. Note that the calculation rules depicted in FIG. 5 are merely an example, and various calculation rules may be set for each item of the service impact.

The estimation rule management unit 135 stores data for managing the estimation rules to be used for estimating the current impact on the service at the time a fault occurs in the processing server group 141. Based on the data stored in the estimation rule management unit 135, the service impact calculation unit 122 can calculate the service impact at the time a fault occurs in the processing server group 141.

FIG. 6 is a diagram showing a table configuration example of data stored in the estimation rule management unit 135. The estimation rule management unit 135 manages estimation rules which define the method of estimating the future service impact from the log information stored in the log management unit 137 and the log statistical information stored in the log statistical value management unit 136 by using, for instance, the data of the table configuration illustrated in FIG. 6. The data table of FIG. 6 is configured from the respective items of a service impact 601, and estimation rules 602.

The service impact 601 represents information to be provided by the fault information providing server 101 to the user terminal 151 and the in-vehicle terminal 152 at the time that a fault occurs, and corresponds to the service impact 303 of the notification information management unit 132 shown in FIG. 3. Note that, as described above, preferably, the respective items of the service impact 601 do not overlap with the service impact 501 in the stored data of the calculation rule management unit 134 shown in FIG. 5. The estimation rules 602 represent the specific estimation method of the respective items of the service impact 601.

In the first line of the data table of FIG. 6, "scheduled fault recovery time" is indicated in the column of service impact 601, and the addition of "time required for recovery" to the current time and the identification method of "time required for recovery" are indicated in the corresponding column of estimation rules 602. This represents that the scheduled recovery time from the fault, which is one type of service impact, can be estimated by identifying the time required for recovery, and adding the result to the current time. Here, "time required for recovery" can be obtained according to the method defined by the estimation rules 602 by using the log information stored in the log management unit 137. Specifically, for instance, in cases where a character string of "AA" is included in the most recent log of the Web server among the log information stored in the log management unit 137, the time required for recovery is deemed to be 5 minutes. Moreover, in cases where a character string of "BB" is included in the most recent log of the AP server, the time required for recovery is deemed to be 7 minutes, and in cases where a character string of "CC" is included in the most recent log of the AP server, the time required for recovery is deemed to be 8 minutes. Note that the range of the most recent log may be designated as a time such as 1 minute, or as a quantity such as 10 logs. Consequently, for instance, when the current time is 19:22 and the time required for recovery is deemed to be 5 minutes, the scheduled fault recovery time can be estimated as being 19:22+5 minutes=19:27.

Moreover, in the second line, "number of unusable terminals" is indicated in the column of service impact 601, and the estimation of the number of unusable terminals based on "time of fault occurrence", "scheduled fault recovery time", and "hourly average number of connected terminals" is indicated in the corresponding column of estimation rules 602. This represents that the number of unusable terminals, or number of users whose use of the service is limited due to the fault, which is one type of service impact, can be estimated based on the time of fault occurrence, the scheduled fault recovery time and the hourly average number of connected terminals. Here, the scheduled fault recovery time can be obtained in the manner described above. Moreover, the time of fault occurrence can be acquired by the fault occurrence/recovery management unit 123, and the hourly average number of connected terminals can be acquired from the statistical value of the log information stored in the log statistical value management unit 136. Consequently, for instance, let it be assumed that the time of fault occurrence is 19:17, the scheduled fault recovery time is 19:27, and, as the hourly average number of connected terminals, the average number of connected terminals between 19:00 and 19:59 is 600 (units/hour). In the foregoing case, since the fault occurrence period is the 10 minute period from 19:17 to 19:27, the number of unusable terminals can be estimated to be 600 (units/hour)×10 (minutes)÷60 (minutes)=100 units.

Moreover, in the third line, "number of connection errors" is indicated in the column of service impact 601, and the estimation of the number of connection errors based on "time of fault occurrence", "scheduled fault recovery time", and "hourly average number of accesses" is indicated in the corresponding column of estimation rules 602. This represents that the number of connection errors, or the number of accesses from users whose connection to the processing server group 141 will be an error due to the fault, which is one type of service impact, can be estimated based on the time of fault occurrence, the scheduled fault recovery time and the hourly average number of accesses. Here, the time of fault occurrence and the scheduled fault recovery time can be acquired in the same manner as in the case of estimating the number of unusable terminals described above. Moreover, the hourly average number of accesses can be acquired from the statistical value of the log information stored in the log statistical value management unit 136. Consequently, for instance, let it be assumed that the time of fault occurrence is 19:17, the scheduled fault recovery time is 19:27, and, as the hourly average number of accesses, the average number of accesses between 19:00 to 19:59 is 1200 (accesses/hour). In the foregoing case, since the fault occurrence period is the 10 minute period from 19:17 to 19:27, the number of connection errors can be estimated to be 1200 (accesses/hour)×10 (minutes)÷60 (minutes)=200 accesses.

Moreover, in the fourth line, "response delay rate" is indicated in the column of service impact 601, and the estimation of the response delay rate based on "hourly average response time" and "server reduction ratio" is indicated in the corresponding column of estimation rules 602. This represents that the response delay rate from the processing server group 141 due to the fault, which is one type of service impact, can be estimated based on the hourly average response time and the server reduction ratio. Here, the server reduction ratio is calculated by dividing the number of servers in operation by the number of servers used for the redundant configuration as indicated in the column of estimation rules 602. Here, it is possible to calculate the server reduction ratio for each type of server, and adopt the lowest value thereof as the server reduction ratio of the processing server group 141. For example, in cases where the processing server group 141 is configured from the three types of servers of a Web server, an AP server, and a DB server, and one Web server of the two Web servers used for the redundant configuration goes down due to a fault, the reduction ratio of the Web server will be 0.5. Similarly, by obtaining the reduction ratio of the AP server and the DB server and selecting the lowest value thereof, the server reduction ratio of the processing server group 141 can be obtained. Moreover, the hourly average response time can be acquired from the statistical value of the log information stored in the log statistical value management unit 136. Consequently, for instance, let it be assumed that the hourly average response time is 1.6 seconds, and the server reduction ratio is 0.5. In the foregoing case, the response delay time can be estimated to be 1.6 (seconds)÷0.5=3.2 (seconds).

As explained above, the estimation rule management unit 135 stores the estimation rules for estimating the value of the respective items of the service impact. Note that the estimation rules depicted in FIG. 6 are merely an example, and various estimation rules may be set for each item of the service impact.

The log statistical value management unit 136 stores data for managing the log statistical information related to the statistical value of the log information of the processing server group 141 created by the log statistical processing unit 124. Based on the data stored in the log statistical value management unit 136, the service impact calculation unit 122 can calculate the service impact at the time that a fault occurs in the processing server group 141.

Figure 7:
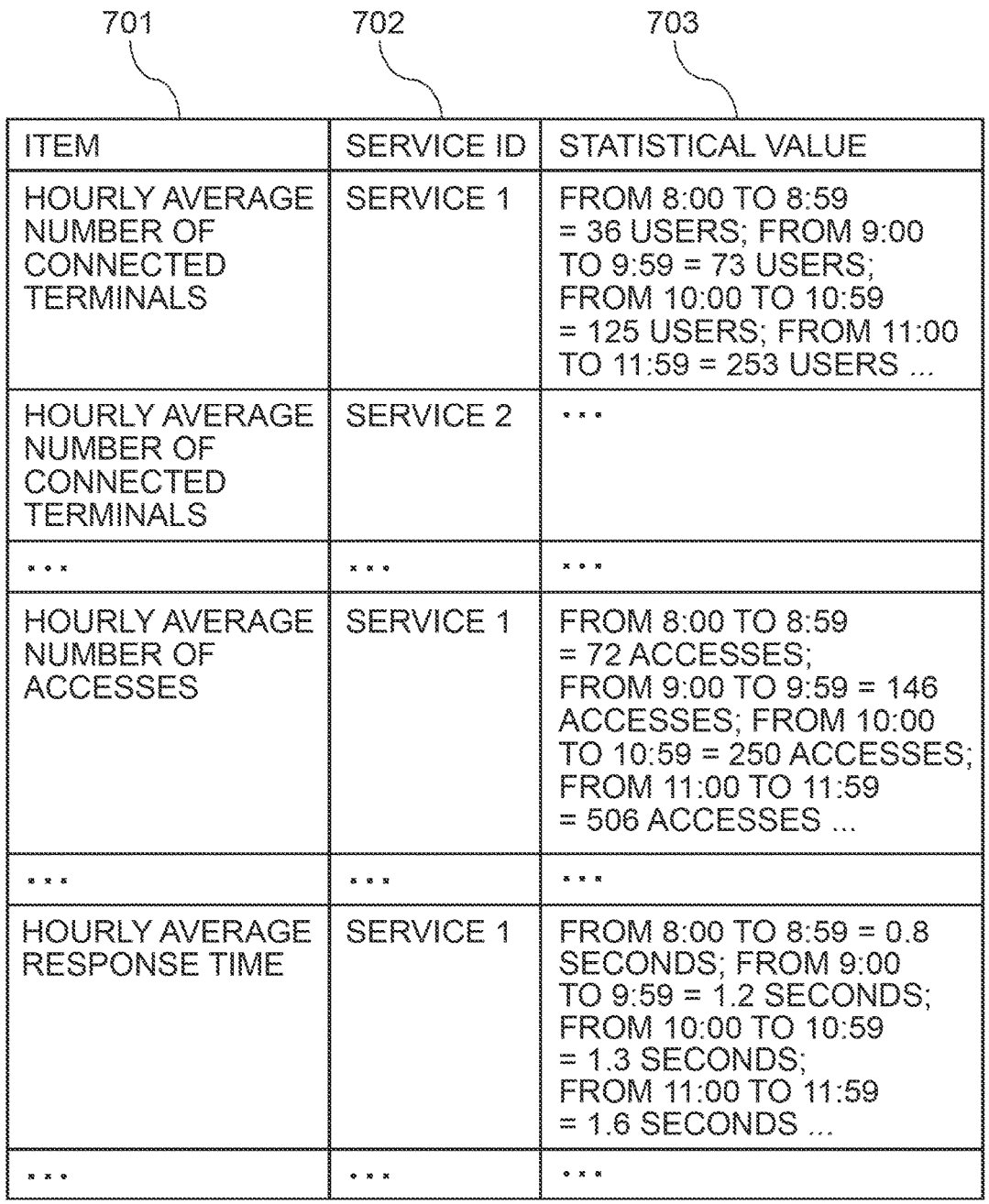
FIG. 7 is a diagram showing a table configuration example of data stored in the log statistical value management unit.

FIG. 7 is a diagram showing a table configuration example of data stored in the log statistical value management unit 136. The log statistical value management unit 136 manages, for each service provided by the respective servers of the processing server group 141, the statistical value of the log information managed by the log management unit 137 by using, for instance, the data of the table configuration illustrated in FIG. 7. The data table of FIG. 7 is configured from an item 701, a service ID 702, and a statistical value 703.

The item 701 represents the contents of the respective statistical values. The service ID 702 represents an identifier for uniquely identifying the service provided by each server of the processing server group 141, and corresponds to the provided service 302 of the notification information management unit 132 shown in FIG. 3, and the service ID 401 of the service configuration management unit 133 shown in FIG. 4. The statistical value 703 represents the statistical values of each item.

In the first line of the data table of FIG. 7, "hourly average number of connected terminals" is indicated in the column of item 701, and "service 1" is indicated in the column of service ID 702, respectively, and numerical values per hour are indicated in the corresponding column of statistical value 703. This represents the hourly average number of connected terminals as one statistical value of the log information. This statistical value can be calculated, for example, by identifying the connection start log from the in-vehicle terminal 152 and totaling the results per hour in the log information of the Web server stored in the log management unit 137. Here, let it be assumed that the log information stored in the log management unit 137 includes an in-vehicle terminal ID for identifying the in-vehicle terminal 152 connected to the Web server, and a service ID for identifying the service used by the in-vehicle terminal 152. Note that, when there are a plurality of Web servers in the processing server group 141, it is also possible to obtain the hourly average number of connected terminals of each Web server, and use the average value thereof as the hourly average number of connected terminals of the processing server group 141. Otherwise, the maximum value or the minimum value may be used in substitute for the average value.

The "hourly average number of accesses" and the "hourly average response time" indicated in the other lines can be calculated according to the same methods described above. The specific calculation method of the response time is the same as the method explained in FIG. 5.

The log management unit 137 stores data for managing the log information of the processing server group 141. Based on the data stored in the log management unit 137, the service impact calculation unit 122 can calculate the service impact at the time a fault occurs in the processing server group 141.

The log management unit 137 collects log information from the processing server group 141 via the communication unit 115. Here, the log information may also be notified by the processing server group 141 to the fault information providing server 101, or the log information may be acquired by the fault information providing server 101 requesting the log information to the processing server 141. Moreover, the log information may be collected in real time, or collected periodically.

Figure 8:
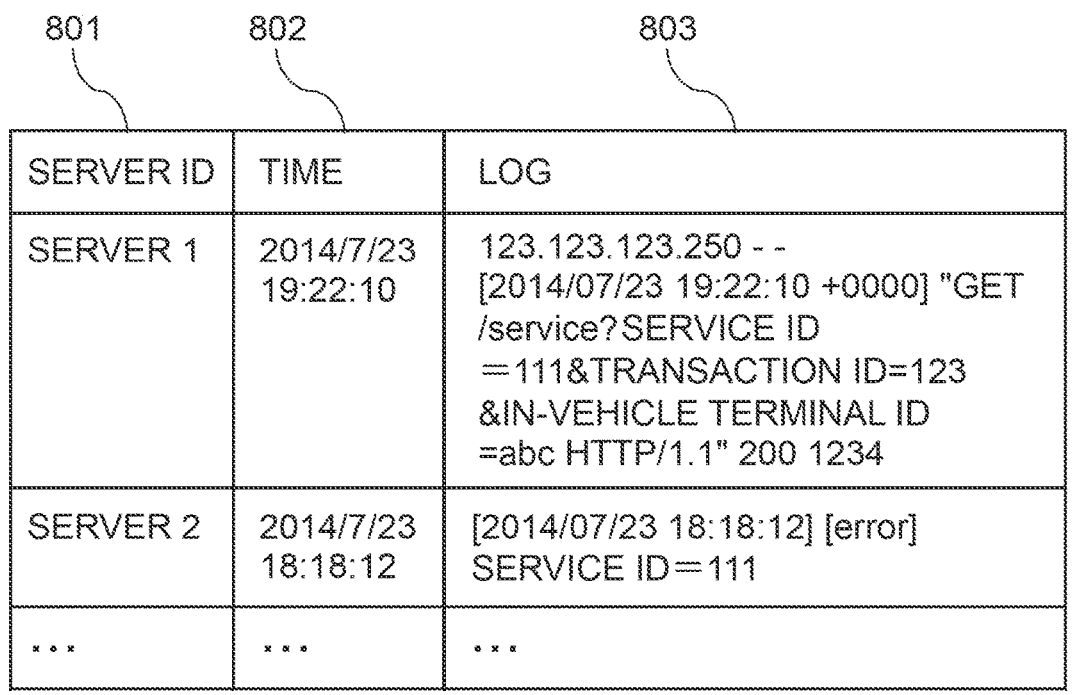
FIG. 8 is a diagram showing a table configuration example of data stored in the log management unit.

FIG. 8 is a diagram showing a table configuration example of data stored in the log management unit 137. The log management unit 137 manages log information related to the history of the service provided by each server of the processing server group 141 by using, for instance, the data of the table configuration illustrated in FIG. 8. The data table of FIG. 8 is configured from a server ID 801, a time 802, and a log 803.

The server ID 801 represents an identifier for uniquely identifying the server in which each log occurred. The time 802 represents the time that each log occurred, and the log 803 represents the contents of the specific log information output from each server of the processing server group 141.

As shown in the data table of FIG. 8, the log information stored in the log 803 includes information such as a service ID for identifying the provided service, an in-vehicle terminal ID for identifying the in-vehicle terminal 152 to which the service was provided, and a transaction ID for identifying the transaction. By storing the transaction ID as log information, it is possible to link the reception of a request from each in-vehicle terminal 152 and the reply to the received request as explained in FIG. 5.

The foregoing data is stored in each management unit of the storage unit 111.

When a system fault occurs in any one of the servers of the processing server group 141, the service impact notification unit 121 sends service impact information, which is used for notifying the impact on the service provided by that server, to the user terminal 151 and the in-vehicle terminal 152 via the communication unit 115. Here, the service impact notification unit 121 receives information related to the service impact from the fault occurrence/recovery management unit 123. The information related to the service impact has the same data structure as the data stored in the notification information management unit 132 shown in FIG. 3. In other words, the information related to the service impact is configured from a combination of "in-vehicle terminal group" which indicates the group of the target in-vehicle terminal 152, "service ID" which indicates the contents of the provided service that will be influenced by the fault, and "service impact" which indicates the impact on the provided service due to the fault. For example, let it be assumed that service impact information of "in-vehicle terminal group=group 1", "service ID=service 1", and "service impact=scheduled fault recovery time 19:27" was sent. This service impact information means that the scheduled fault recovery time of service 1, which is being provided by each in-vehicle terminal 152 belonging to group 1, is 19:27. Note that the service impact notification unit 121 may manage only the latest values of the information received from the fault occurrence/recovery management unit 123, or manage the history of the received information. In cases of managing the history, the history of only specific items of the service impact may be managed.

The service impact notification unit 121 identifies the group of the in-vehicle terminal 152 based on the information received from the fault occurrence/recovery management unit 123, and notifies the service impact to the user terminal 151 corresponding to that group and the respective in-vehicle terminals 152. Here, when notifying the service impact to the user terminal 151, preferably, the manufacturer of the identified group of the in-vehicle terminal 152 is identified and the user terminal 151 of that manufacturer is set as the target of notification based on the information stored in the in-vehicle terminal management unit 131 based on the data structure shown in FIG. 2. For example, when the user of the user terminal 151 is the administrator of "manufacturer A", the line in which "manufacturer A" is indicated as the manufacturer name 201 of FIG. 2 is extracted with "manufacturer A" as the key, and "group 1" and "group 2" are identified based on the descriptions of the in-vehicle terminal group 202 in that line. Subsequently, information related to the service impact of "in-vehicle terminal group=group 1" or "in-vehicle terminal group=group 2" is extracted from the information of the service impact received from the fault occurrence/recovery management unit 123, and notified to the user terminal 151. Here, preferably, information such as the time of fault occurrence and the list of in-vehicle terminals belonging to the in-vehicle terminal group is also notified.

Figure 9:
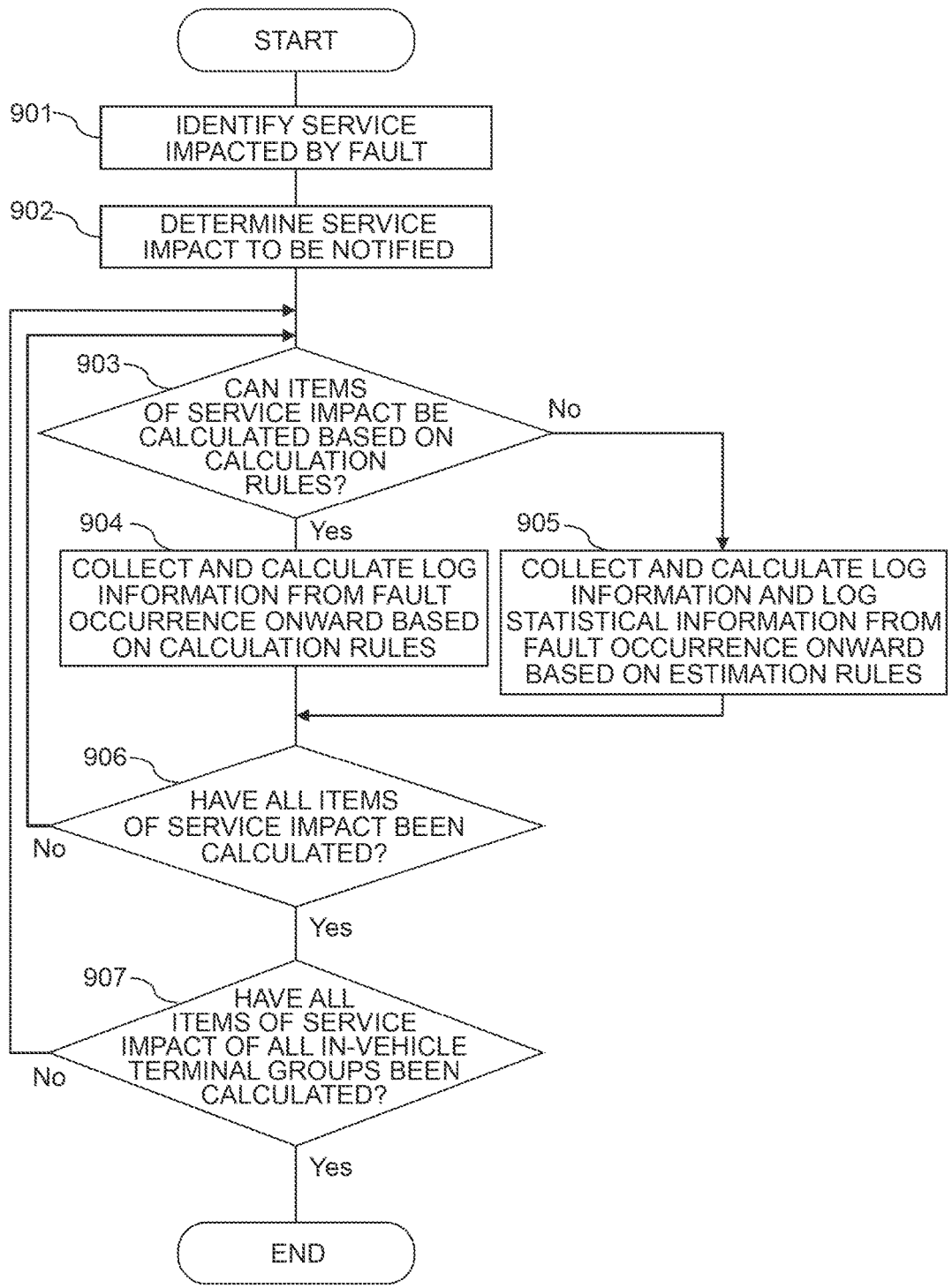
FIG. 9 is a diagram showing a flowchart of the processing to be executed by the service impact calculation unit.

FIG. 9 is a diagram showing a flowchart of the processing to be executed by the service impact calculation unit 122 of the fault information providing server 101.

In first step 901, the service impact calculation unit 122 identifies the service that is influenced by the fault. Here, the service impact calculation unit 122 receives information related to the time of fault occurrence and the server of fault occurrence from the fault occurrence/recovery management unit 123. Subsequently, the service impact calculation unit 122 searches the service configuration management unit 133 with the server of fault occurrence represented by the received information as the key, and identifies the service ID of the service that is influenced by the fault. Specifically, the service impact calculation unit 122 searches the line in which the ID number of the server of fault occurrence is included in the column of server ID 403 among the information stored in the service configuration management unit 133 based on the data structure shown in FIG. 4, and identifies the service ID from the contents stored in the column of service ID 401 of that line. Note that since there are cases where a server is used for multiple services, even when there is only one server ID, there may be cases where multiple service IDs are searched.

Next, in step 902, the service impact calculation unit 122 identifies the items of the service impact to be notified. Here, the service impact calculation unit 122 searches the notification information management unit 132 with the service ID identified in step 901 as the key, and determines the items of the service impact. Specifically, the service impact calculation unit 122 searches the line in which the service ID identified in step 901 is included in the column of provided service 302 among the information stored in the notification information management unit 132 based on the data structure shown in FIG. 3, and identifies the items of the service impact from the contents stored in the column of service impact 303 of that line. Here, the in-vehicle terminal group to be notified is also identified based on the contents described in the column of in-vehicle terminal group 301 of the same line.

Next, in step 903, the service impact calculation unit 122 determines whether the items of the service impact identified in step 902 can be calculated based on the calculation rules managed by the calculation rule management unit 134. Here, the service impact calculation unit 122 selects one among the combinations of the service ID identified in step 901, and the in-vehicle terminal group and the items of the service impact identified in step 902. Subsequently, the service impact calculation unit 122 searches the calculation rule management unit 134 with the items of the service impact of the selected combination as the key, and searches whether or not there is any corresponding service impact. Specifically, the service impact calculation unit 122 searches the items of the service impact of the selected combination from the contents stored in the column of service impact 501 among the information stored in the calculation rule management unit 134 based on the data structure shown in FIG. 5. Consequently, when there are items of the service impact in the service impact 501 (Yes), the service impact calculation unit 122 proceeds to step 904 upon determining that the items of the service impact can be calculated based on the calculation rules, and, when there are no items of the service impact in the service impact 501 (No), the service impact calculation unit 122 proceeds to step 905 upon determining that the items of the service impact cannot be calculated based on the calculation rules. For example, when the searched item of the service impact is "service availability", this exists in the first line of the service impact 501 in the table of FIG. 5. Accordingly, in the foregoing case, the service impact calculation unit 122 proceeds to step 904 upon determining that the items of the service impact can be calculated based on the calculation rules. Meanwhile, for example, when the searched item of the service impact is "scheduled fault recovery time", this does not exist in the table of FIG. 5. Accordingly, in the foregoing case, the service impact calculation unit 122 proceeds to step 905 upon determining that the items of the service impact cannot be calculated based on the calculation rules.

Upon proceeding from step 903 to step 904, the service impact calculation unit 122 calculates the service impact based on the log information and the calculation rules in step 904. Here, the service impact calculation unit 122 acquires the calculation rules for calculating the item of the service impact based on the contents of the calculation rules 502 corresponding to the item of the service impact searched in step 903. Next, the service impact calculation unit 122 collects log information required in the acquired calculation rules among the log information from the time of fault occurrence onward stored in the log management unit 137. Subsequently, the service impact calculation unit 122 uses the collected log information and performs the calculation according to the calculation rules, and thereby calculates the value of the service impact.

The specific calculation method of the service impact for a combination of, for instance, "time of fault occurrence=19: 22", "service ID=service 1", and "service impact=response time" is now explained. In the foregoing case, the service impact calculation unit 122 foremost refers to the second line of the stored information table of the calculation rule management unit 134 shown in FIG. 5 and identifies that the calculation rules of the response time are "average value of 'reply time of Web server—request reception time of Web server'". Next, by making an inquiry to the service configuration management unit 133 regarding the Web server in service 1, the service impact calculation unit 122 acquires the information of "Web server=server 1, server 2" from the stored information table of the service configuration management unit 133 shown in FIG. 4. Next, the service impact calculation unit 122 acquires the log information 803 where the server ID 801 is "server 1" or "server 2" and the time 802 is "19:22 onward" from the stored information table of the log management unit 137 shown in FIG. 8. Subsequently, the service impact calculation unit 122 calculates "average value of 'reply time of Web server—request reception time of Web server'" based on the calculation rules using the acquired log information.

Upon proceeding from step 903 to step 905, the service impact calculation unit 122 calculates the service impact based on the log information, the log statistical information and the estimation rules in step 905. Here, the service impact calculation unit 122 searches the estimation rule management unit 135 with the item of the service impact identified in step 902 as the key, and acquires the estimation rules for calculating the item of the service impact. Next, the service impact calculation unit 122 collects the log information and the log statistical information required in the acquired estimation rules among the log information and the log statistical information of the time of fault occurrence onward stored in the log management unit 137 and the log statistical value management unit 136, respectively. Subsequently, the service impact calculation unit 122 uses the collected log information and log statistical information and performs the calculation according to the estimation rules, and thereby calculates the value of the service impact.

The specific calculation method of the service impact for a combination of, for instance, "current time=19:35", "time of fault occurrence=19.22", "service ID=service 1", and "service impact=scheduled fault recovery time" is now explained. In the foregoing case, the service impact calculation unit 122 foremost refers to the first line of the stored information table of the estimation rule management unit 135 shown in FIG. 6, and identifies the estimation rules of the scheduled fault recovery time. Next, by making an inquiry to the service configuration management unit 133 regarding the Web server and the AP server in service 1 of the identified estimation rules, the service impact calculation unit 122 acquires the information of "Web server=server 1, server 2" and "AP server=server 3, server 4" from the stored information table of the service configuration management unit 133 shown in FIG. 4. Next, the service impact calculation unit 122 acquires the log information 803 where the server ID 801 is "server 1", "server 2", "server 3" or "server 4" and the time 802 is "19:32 onward" from the stored information table of the log management unit 137 shown in FIG. 8. Here, the range of the most recent log was set to 3 minutes, and log information of 19:32 onward, which is 3 minutes before the current time, was acquired. Subsequently, the service impact calculation unit 122 calculates the scheduled fault recovery time based on the estimation rules using the acquired log information. For example, when the time required for recovery is 5 minutes, by adding the 5 minutes as the time required for recovery to 19:35 as the current time, the scheduled fault recovery time is estimated to be 19:40.

Moreover, the specific calculation method of the service impact for a combination of, for instance, "time of fault occurrence=19.22", "scheduled fault recovery time=19:40", "service ID=service 1", and "service impact=number of unusable terminals" is now explained. In the foregoing case, the service impact calculation unit 122 foremost refers to the second line of the stored information table of the estimation rule management unit 135 shown in FIG. 6, and identifies the estimation rules of the number of unusable terminals. Next, the service impact calculation unit 122 acquires the statistical value 703 where the item 701 is "hourly average number of connected terminals" and the service ID 702 is "service 1" from the stored information table of the log statistical value management unit 136 shown in FIG. 7. Subsequently, the service impact calculation unit 122 calculates the number of unusable terminals based on the estimation rules using the acquired log statistical information. For example, when the average number of connected terminals from 19:00 and 19:59 is 100 (units/hour) and the fault occurrence period is 18 minutes (19:22 to 19:40), the number of unusable terminals=100 (units/hour)×18 (minutes)÷60 (minutes)=30 terminals is estimated.

Next, in step 906, the service impact calculation unit 122 confirms whether the service impact of all combinations has been calculated in relation to the service ID identified in step 901 and the item of the service impact identified in step 902. The service impact calculation unit 122 proceeds to step 907 when the service impact of all combinations has been calculated (Yes), and returns to step 903 when the service impact of all combinations has not been calculated (No).

Next, in step 907, the service impact calculation unit 122 confirms whether the service impact of all groups has been calculated in relation to all in-vehicle terminal groups identified in step 902. The service impact calculation unit 122 ends the processing of FIG. 9 when the service impact of all groups has been calculated (Yes), and returns to step 903 when the service impact of all groups has not been calculated (No).

Based on the processing explained above, the service impact calculation unit 122 can determine the items of the service impact to be calculated regarding the service that is influenced by the fault among the services provided by the processing server group 141. Furthermore, the service impact calculation unit 122 can calculate the service impact, for each in-vehicle terminal group that is influenced by the service provided by the processing server group 141 due to the occurrence of fault based on the calculation rules managed by the calculation rule management unit 134 or the estimation rules managed by the estimation rule management unit 135.

Figure 10:
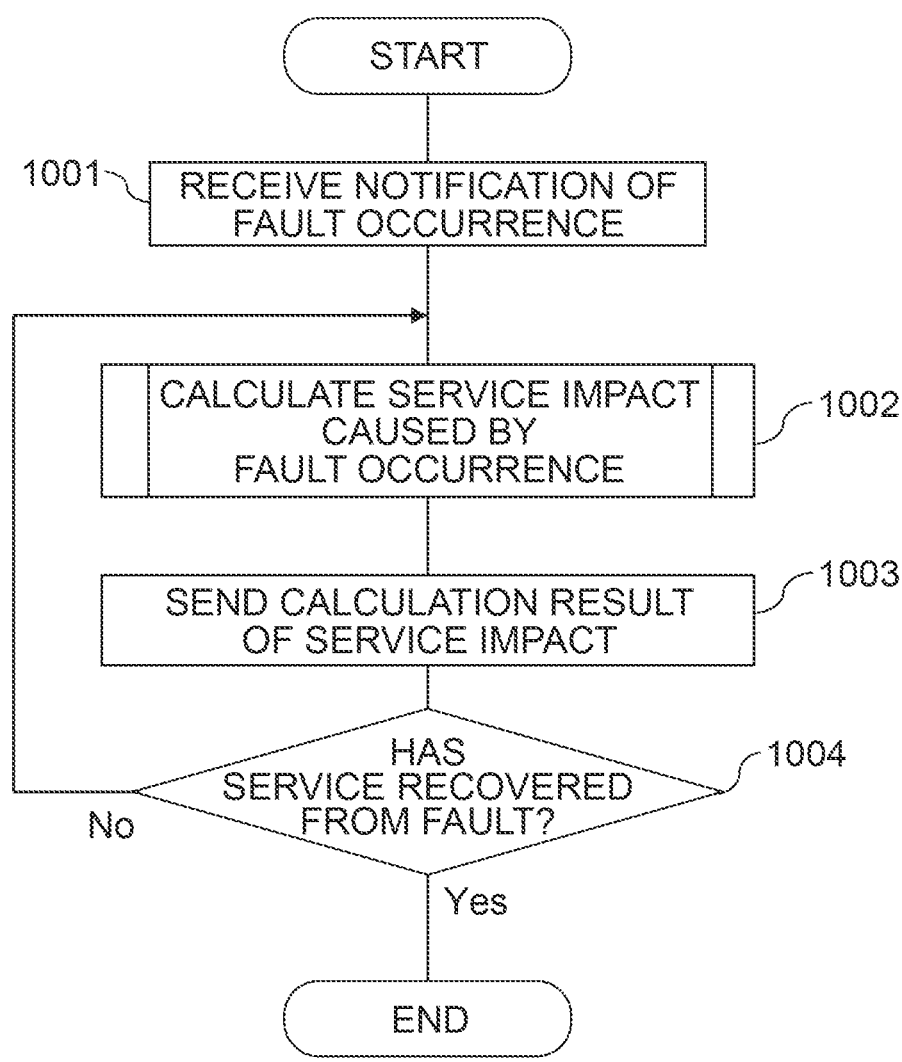
FIG. 10 is a diagram showing a flowchart of the processing to be executed by the fault occurrence/recovery management unit.

FIG. 10 is a diagram showing a flowchart of the processing to be executed by the fault occurrence/recovery management unit 123 of the fault information providing server 101.

Foremost in step 1001, the fault occurrence/recovery management unit 123 receives a notification of a fault occurrence from the processing server group 141. Here, as the fault occurrence notification, information such as the fault ID, the time of fault occurrence, and the server of fault occurrence is received from the processing server group 141. Here, the fault ID is an identifier for uniquely identifying the fault that occurred. It is also possible to monitor the resources of the processing server group 141 with an external server and automatically notify an alarm to the fault information providing server 101, or manually monitor the resources of the processing server group 141 and notify an alarm.

Next, in step 1002, the fault occurrence/recovery management unit 123 uses the service impact calculation unit 122 to calculate the service impact caused by the occurrence of a fault. Here, the fault occurrence/recovery management unit 123 requests the service impact calculation unit 122 to calculate the service impact by using, as the parameters, the time of fault occurrence and the server of fault occurrence in the fault occurrence notification received in step 1001. In response to this request, the service impact calculation unit 122 executes the processing explained with reference to the flowchart of FIG. 9, and thereafter replies the calculation result of the service impact to the fault occurrence/recovery management unit 123. The calculation result of the service impact sent from the service impact calculation unit 122 to the fault occurrence/recovery management unit 123 is configured from information such as the in-vehicle terminal group, the service ID, and the service impact. For example, as the calculation result of the service impact, information such as "in-vehicle terminal group=group 1", "service ID=service 1", and "scheduled fault recovery time=19:27" is sent. This represents that a fault occurred in service 1 being provided by the processing server group 141 to the respective in-vehicle terminals 152 of group 1, and the scheduled fault recovery time is 19:27.

Next, in step 1003, the fault occurrence/recovery management unit 123 sends the calculation result of the service impact acquired in step 1002 to the service impact notification unit 121.

Next, in step 1004, the fault occurrence/recovery management unit 123 determines whether the fault received in step 1001 has been recovered. The fault occurrence/recovery management unit 123 ends the processing of FIG. 10 when the service has recovered from the fault (Yes), and returns to step 1002 when the service has not recovered from the fault (No). This determination may be made, for example, by receiving the notification of the fault ID and the fault recovery time of the recovered service in the same manner as step 1001.

Note that, while the foregoing explanation described a case of calculating the service impact with the occurrence of a fault in the processing server group 141 as the trigger based on the processing of step 1001, it is also possible to calculate the service impact with a request from the user terminal 151 or the in-vehicle terminal 152 as the trigger.

Moreover, upon receiving the notification of fault occurrence from the processing server group 141 in step 1001, preferably, the fault occurrence/recovery management unit 123 periodically performs the processing of steps 1002 to 1004. As a result of adopting the foregoing method, the service impact calculation unit 122 can re-calculate the latest value of the service impact for each predetermined cycle during the period from the time that a fault occurs in the processing server group 141 to the time that the service recovers from the fault. Furthermore, the service impact notification unit 121 can notify the latest value of the service impact for each predetermined cycle obtained by the service impact calculation unit 122 to the service user. Nevertheless, rather the performing the foregoing process, it is also possible to calculate the service impact only for a fixed number of times, or the calculation of the service impact may be stopped based on a halt request from the user terminal 151 or the in-vehicle terminal 152.

An example of the notification screen that is displayed on the user terminal 151 and the in-vehicle terminal 152, respectively, upon receiving a notification of the service impact caused by the occurrence of a fault in the processing server group 141 from the fault information providing server 101 is now explained.

Figure 11:
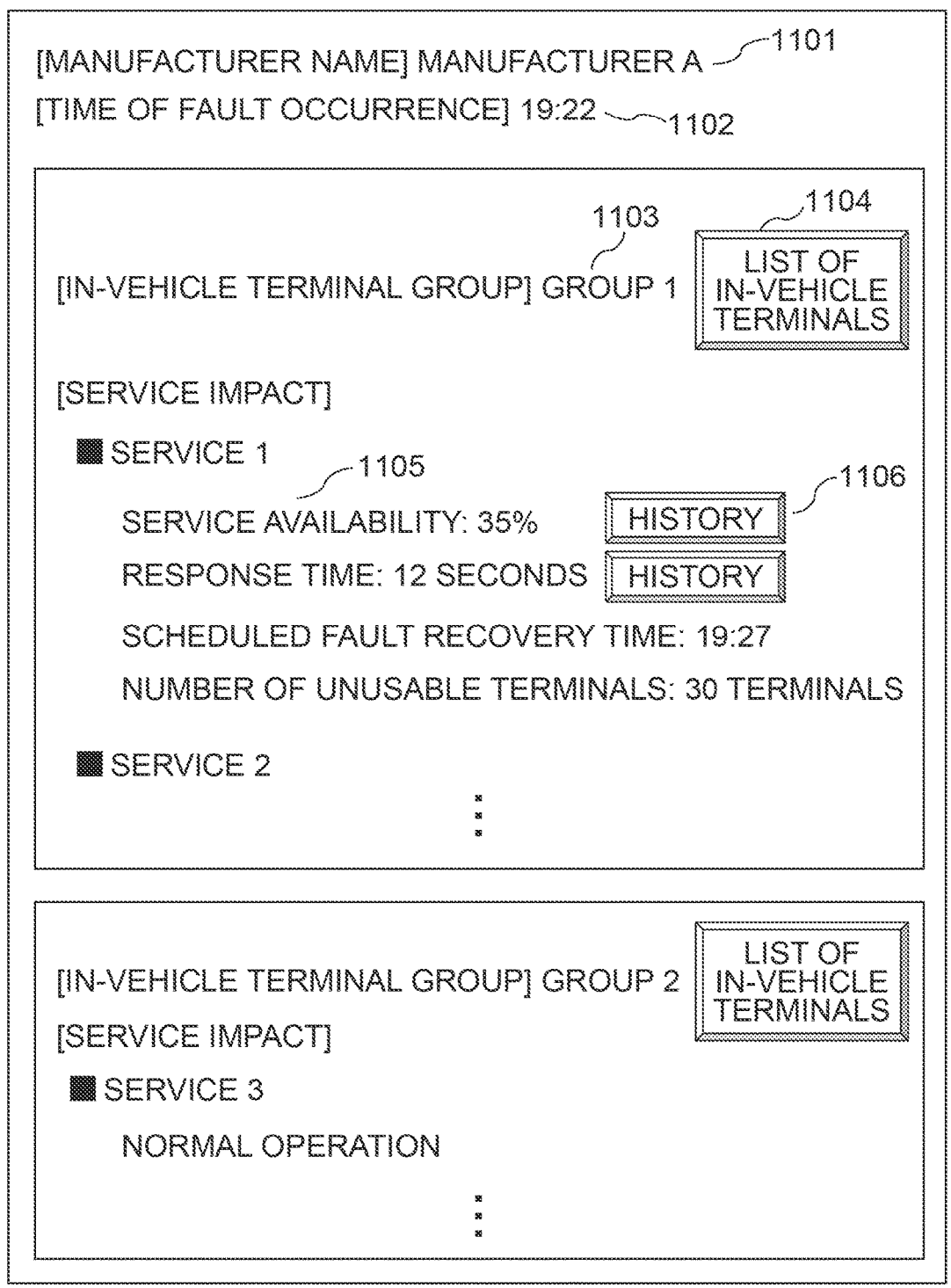
FIG. 11 is a diagram showing a notification screen example to be displayed on a user terminal.

FIG. 11 is a diagram showing a notification screen example to be displayed on the user terminal 151. The screen shown in FIG. 11 displays a manufacturer name 1101, a time of fault occurrence 1102, and information of the service impact of the respective in-vehicle terminal groups belonging to manufacturer A. Information of the service impact for each in-vehicle terminal group includes an in-vehicle terminal group 1103, an in-vehicle terminal list button 1104, a per-service service impact 1105, and a history button 1106.

In the screen of FIG. 11, when the administrator of the user terminal 151 operates the user terminal 151 and presses the in-vehicle terminal list button 1104, a list of the in-vehicle terminals 152 belonging to the group (group 1 in this example) of the in-vehicle terminals 152 indicated by the in-vehicle terminal group 1103 corresponding to the in-vehicle terminal list button 1104 is displayed as a pop-up screen. Moreover, when the history button 1106 is pressed, the history information of the service impact corresponding to the history button 1106 is displayed as a graph. For example, when the history button 1106 on the right side of the service availability is pressed, a history graph of the service availability is displayed as a pop-up screen.

Note that, in the screen of FIG. 11, information of "normal operation" is displayed in relation to the services that are not influenced by the fault. Consequently, the administrator of the manufacturer operating the user terminal 151 can comprehend the service provision status and the service impact caused by the fault in the vehicles being sold by that manufacturer.

Figure 12:
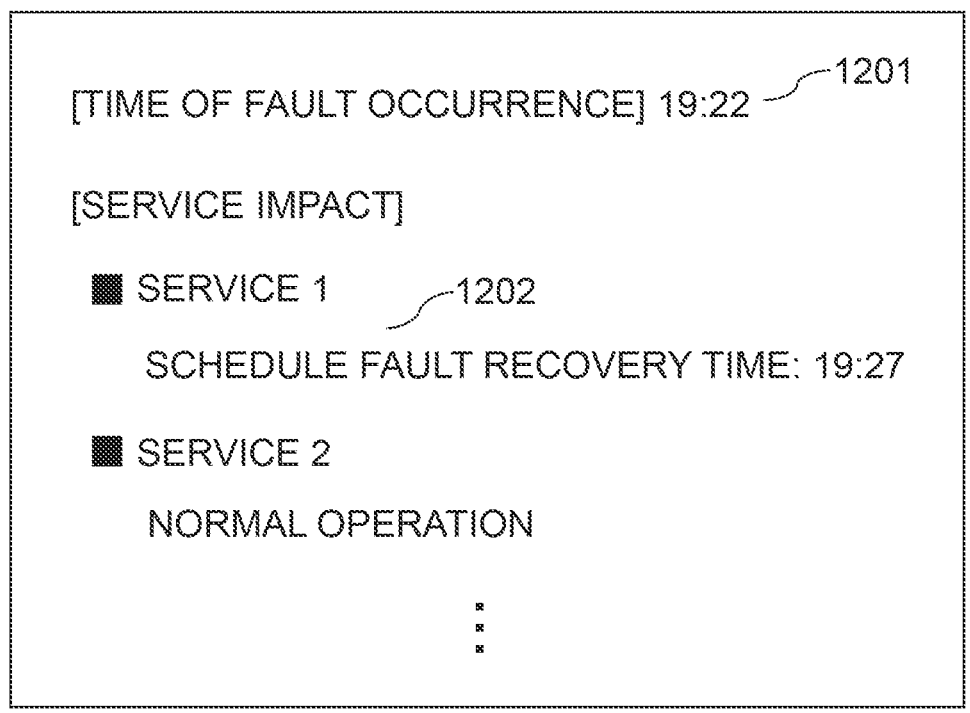
FIG. 12 is a diagram showing a notification screen example to be displayed on an in-vehicle terminal.

FIG. 12 is a diagram showing a notification screen example to be displayed on the in-vehicle terminal 152. On the screen shown in FIG. 12, a time of fault occurrence 1201 and a per-service service impact 1202 are displayed.

On the screen of FIG. 12 also, as with FIG. 11, information of "normal operation" is displayed in relation to the services that are not influenced by the fault. Consequently, the end user operating the in-vehicle terminal 152 can comprehend the operational status of the services that he/she is using.

The following effects can be yielded according to the embodiment described above.

(1) The fault information providing server 101 is connected to the processing server group 141 configured from a plurality of servers, and provides information related to a fault that occurred in the processing server group 141 to the user of the service provided by the processing server group 141. The fault information providing server 101 comprises the fault occurrence/recovery management unit 123 which manages fault occurrence of the processing server group 141, the log management unit 137 which manages log information related to the history of the service provided by each server of the processing server group 141, the calculation rule management unit 134 and the estimation rule management unit 135 as a rule management unit which manages rules related to the service impact representing the impact on the service caused by the fault, the service impact calculation unit 122 which calculates the service impact based on the log information managed by the log management unit 137 and the rules managed by the rule management unit, and the service impact notification unit 121 which notifies the service impact calculated by the service impact calculation unit 122 to the user. As a result of adopting the foregoing configuration, the service user can know the impact to the provided service at the time that a system fault occurs.

(2) The foregoing rule management unit includes the calculation rule management unit 134 which manages calculation rules for calculating a current impact on the service caused by the fault. The service impact calculation unit 122 calculates the service impact based on the log information managed by the log management unit 137 and the calculation rules managed by the calculation rule management unit 134. As a result of adopting the foregoing configuration, the current impact on the service caused by the fault can be accurately calculated.

(3) Moreover, the fault information providing server 101 further comprises the log statistical value management unit 136 which manages log statistical information related to the statistical value of the log information, and the foregoing rule management unit includes the estimation rule management unit 135 which manages estimation rules for estimating a future impact on the service caused by the fault. The service impact calculation unit 122 calculates the service impact based on the log information managed by the log management unit 137, the log statistical information managed by the log statistical value management unit 136, and the estimation rules managed by the estimation rule management unit 135. As a result of adopting the foregoing configuration, the future impact on the service caused by the fault can be accurately calculated.

(4) The estimation rule management unit 135 manages, for example, estimation rules including at least one among estimation rules for estimating the scheduled recovery time from the fault, estimation rules for estimating the number of the users whose use of the service will be limited due to the fault, estimation rules for estimating the number of accesses from the users whose connection to the processing server group 141 will be an error due to the fault, and estimation rules for estimating the response delay rate from the processing server group 141 due to the fault. As a result of adopting the foregoing configuration, estimation rules related to various items of the service impact can be appropriately managed and used for calculating the service impact.

(5) The fault information providing server 101 further comprises an in-vehicle terminal management unit 131 which manages a plurality of in-vehicle terminals 152 in group units, each of which is held by the user and receives the service. The service impact calculation unit 122 calculates the service impact for each group of the in-vehicle terminals 152 managed by the in-vehicle terminal management unit 131. As a result of adopting the foregoing configuration, the service impact can be collectively calculated in group units irrespective of the number of in-vehicle terminals 152 receiving the service.

(6) Moreover, the fault information providing server 101 further comprises the notification information management unit 132 which manages notification information related to the notification item of the service impact set for each group of the in-vehicle terminals 152. The service impact notification unit 121 notifies the service impact, which differs for each group of the in-vehicle terminals 152, to the user based on the notification information managed by the notification information management unit 132. As a result of adopting the foregoing configuration, the optimal service impact can be notified to each group of various in-vehicle terminals 152 receiving different services provided by the processing server group 141.

(7) As a result of the fault occurrence/recovery management unit 123 periodically performing the processing of steps 1002 to 1004 of FIG. 10, preferably, the service impact calculation unit 122 re-calculates a latest value of the service impact for each predetermined cycle, and the service impact notification unit 121 notifies the latest value of the service impact for each of the predetermined cycles obtained by the service impact calculation unit 122 to the user. As a result of adopting the foregoing method, even when the status changes during the period from the time that a fault occurs in the processing server group 141 to the time that the processing server group 141 recovers from the fault, the service impact can be accurately notified.

(8) The service impact notification unit 121 notifies the service impact to the user by sending information for displaying a screen as depicted in FIG. 11 or FIG. 12 on the user terminal 151 and the in-vehicle terminal 152, respectively. These screens include at least the time of fault occurrence 1102 or 1201 representing the time of occurrence of the fault, and the service impact 1105 or 1202 representing the service impact for each of the services according to attributes of the user. As a result of adopting the foregoing configuration, the service impact can be notified in a manner that is easy to understand by the user.

Note that the foregoing embodiments and various modified examples are merely examples, and the present invention is not limited the subject matter hereof so as long as the features of the invention are not impaired. The present invention is not limited to the foregoing embodiments and modified examples, and may be modified variously to the extent that the modification does not deviate from the gist of the present invention.

The disclosure of the following priority application is incorporated herein by reference.

Japanese Patent Application No. 2014-262091 (filed on Dec. 25, 2014)

REFERENCE SIGNS LIST

101: Fault information providing server, 111: Storage unit, 112: CPU, 113: Input unit, 114: Output unit, 115: Communication unit, 121: Service impact notification unit, 122: Service impact calculation unit, 123: Fault occurrence/recovery management unit, 124: Log statistical processing unit, 131: In-vehicle terminal management unit, 132: Notification information management unit, 133: Service configuration management unit, 134: Calculation rule management unit, 135: Estimation rule management unit, 136: Log statistical value management unit, 137: Log management unit, 141: Processing server group, 150: Internet, 151: User terminal, 152: In-vehicle terminal

The invention claimed is:

1. A fault information providing server which is connected to a processing server group configured from a plurality of servers, and which provides information related to a fault that occurred in the processing server group to a user of a service provided by the processing server group, comprising:
   a storage that stores log information related to a history of service provided by each server of the processing server group, stores rules related to a service impact representing an impact on the service caused by the fault, and stores a plurality of in-vehicle terminals in group units, each of the in-vehicle terminals being held by the user and receiving the service; and
   a processor communicatively coupled with the storage, the processor manages fault occurrence of the processing server group;
   calculates the service impact based on the log information and the rules, and calculates the service impact for each group of the in-vehicle terminals; and
   notifies the service impact calculated to the user.

2. The fault information providing server according to claim 1,
   wherein the storage stores calculation rules for calculating a current impact on the service caused by the fault, and
   wherein the processor calculates the service impact based on the log information and the calculation rules.

3. The fault information providing server according to claim 1,
   wherein the storage stores log statistical information related to a statistical value of the log information,
   wherein the storage stores estimation rules for estimating a future impact on the service caused by the fault, and
   wherein the processor calculates the service impact based on the log information, the log statistical information and the estimation rules.

4. The fault information providing server according to claim 3,
   wherein the storage stores estimation rules including at least one among estimation rules for estimating a scheduled recovery time from the fault, estimation rules for estimating a number of the users whose use of the service will be limited due to the fault, estimation rules for estimating a number of accesses from the users whose connection to the processing server group will be an error due to the fault, and estimation rules for estimating a response delay rate from the processing server group due to the fault.

5. The fault information providing server according to claim 1,
wherein the storage stores notification information related to a notification item of the service impact set for each group of the in-vehicle terminals,
wherein the processor notifies the service impact, which differs for each group of the in-vehicle terminals, to the user based on the notification information.

6. The fault information providing server according to claim 1,
wherein the processor re-calculates a latest value of the service impact for each predetermined cycle, and notifies the latest value of the service impact for each of the predetermined cycles obtained to the user.

7. The fault information providing server according to claim 1,
wherein the processor notifies the service impact to the user by sending information to be displayed on a screen including at least a time of occurrence of the fault, and the service impact for each of the services according to attributes of the user.

8. A fault information providing method which uses a fault information providing server connected to a processing server group configured from a plurality of servers, and which provides information related to a fault that occurred in the processing server group to a user of a service provided by the processing server group, the method comprising:
managing, by a processor of the fault information providing server, fault occurrence of the processing server group;
storing, by a storage of the fault information providing server, the storage communicatively coupled with the processor, log information related to a history of service provided by each server of the processing server group;
storing, by the storage, rules related to a service impact representing an impact on the service caused by the fault;
storing, by the storage, a plurality of in-vehicle terminals in group units, each of the in-vehicle terminals being held by the user and receiving the service;
calculating, by the processor, the service impact based on the log information and the rules, and calculating the service impact for each group of the in-vehicle terminals; and
notifying, by the processor, the calculated service impact to the user.

9. The fault information providing method according to claim 8,
wherein calculation rules for calculating a current impact on the service caused by the fault are stored, and
wherein, in calculating the service impact, the service impact is calculated based on the log information and the calculation rules.

10. The fault information providing method according to claim 8,
further comprising storing, by the storage, log statistical information related to a statistical value of the log information, and
estimation rules for estimating a future impact on the service caused by the fault, and
wherein, in calculating the service impact, the service impact is calculated based on the log information, the log statistical information and the estimation rules.

11. The fault information providing method according to claim 10,
further comprising storing, by the storage, estimation rules including at least one among estimation rules for estimating a scheduled recovery time from the fault, estimation rules for estimating a number of the users whose use of the service will be limited due to the fault, estimation rules for estimating a number of accesses from the users whose connection to the processing server group will be an error due to the fault, and estimation rules for estimating a response delay rate from the processing server group due to the fault.

12. The fault information providing method according to claim 8,
further comprising storing, by the storage, notification information related to a notification item of the service impact set for each group of the in-vehicle terminals, and
wherein, in notifying the service impact, the service impact, which differs for each group of the in-vehicle terminals, is notified to the user based on the notification information.

13. The fault information providing method according to claim 8,
wherein, in calculating the service impact, a latest value of the service impact is re-calculated for each predetermined cycle, and
wherein, in notifying the service impact, the obtained latest value of the service impact for each of the predetermined cycles is notified to the user.

14. The fault information providing method according to claim 8,
wherein, in notifying the service impact, the service impact is notified to the user by sending information to be displayed on a screen including at least a time of occurrence of the fault, and the service impact for each of the services according to attributes of the user.

* * * * *